United States Patent Office 3,520,945
Patented July 21, 1970

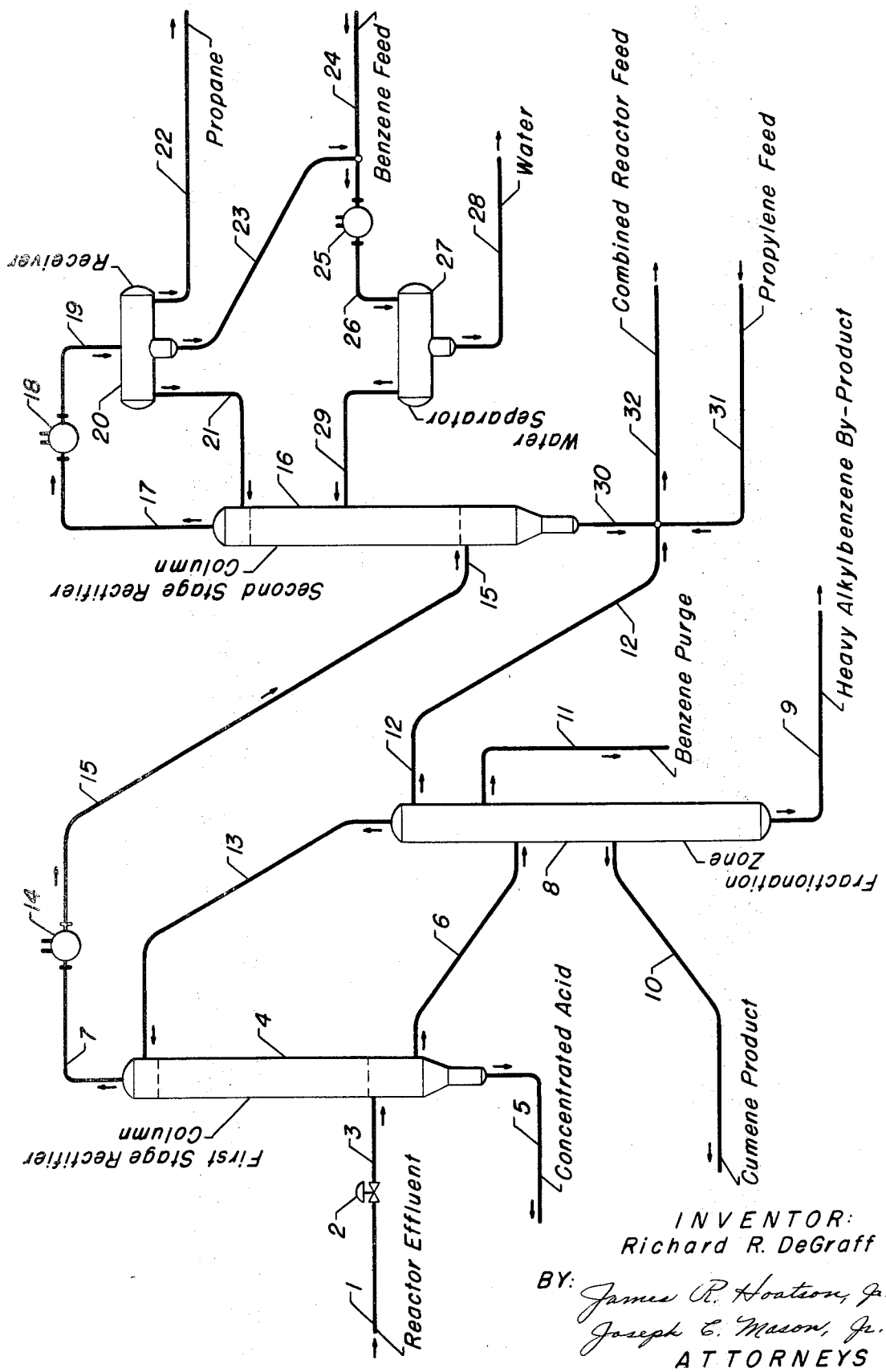

3,520,945
PROCESS FOR CATALYST HYDRATION CONTROL
Richard R. De Graff, Arlington Heights, Ill., assignor to Universal Oil Products Company, Des Plaines, Ill., a corporation of Delaware
Filed Sept. 25, 1968, Ser. No. 762,473
Int. Cl. C07c *3/54, 3/12*
U.S. Cl. 260—671        19 Claims

ABSTRACT OF THE DISCLOSURE

Process for controlling the moisture content of the feed to a reaction zone in a manner sufficient to maintain the state of hydration of a catalyst contained therein at a predetermined level. At least a part of the reactor feed is passed into a saturation zone in admixture with water, and the resulting saturated feed is passed to a distillation zone. The distillation zone provides a bottoms fraction comprising the part of reactor feed containing water in an amount sufficient to control the state of hydration of the catalyst, and an overhead fraction containing excess water for return to the saturation zone. The process is particularly applicable to the control of catalyst hydration in aromatic alkylation and olefinic oligomerization processing, and typical application is in the synthesis of ethylbenzene, cumene, heptene, propylene-trimer, and propylene-tetramer.

FIELD OF THE INVENTION

The present invention relates to a process for controlling the moisture content of the feed to a reaction zone. It particularly relates to a process for maintaining the moisture content of the feed to a reaction zone in a manner sufficient to control the state of hydration of a catalyst contained therein. Most particularly, the present invention relates to an improved method for controlling the state of hydration of a solid phosphoric catalyst contained in an aromatic alkylation reaction zone or in an olefinic oligomerization reaction zone.

The present invention has broad application in the production of alkylated aromatic hydrocarbons. Typically, the present invention provides a method of catalyst hydration control which results in an improved process for the alkylation of benzene with an ethylene-ethane mixture to produce ethylbenzene, and for the alkylation of benzene with a propylene propane mixture to produce cumene. However, the present invention will also have application in the alkylation of other aromatic compounds such as toluene, phenol, hydroxyanisole, etc.

The present invention has additional application in the oligomerization of olefinic hydrocarbons, or olefin-acting compounds such as alkylhalides and alkylsulfates. The oligomerization of olefinic hydrocarbons is commonly referred to as "polymerization of olefins" in the petroleum refining industry. Typically, the present invention provides a method of catalyst hydration control which results in an improved process for the oligomerization of propylene in a propylene-propane mixture to produce propylene-trimer or propylene-tetramer, and for the co-oligomerization of propylene and butene in a reactive mixture containing propane and butane to produce commercial heptene fractions.

DESCRIPTION OF THE PRIOR ART

In a preferred embodiment, the present invention particularly relates to the synthesis of isopropylbenzene or cumene. In the commercial manufacture of cumene it is the art to charge benzene and propylene into a reactor comprising a plurality of stationary or fixed beds containing a solid phosphoric acid catalyst.

It is well known to those skilled in the art that it is typical in the manufacture of cumene to charge the alkylation reactor effluent to a series of fractionation columns comprising a depropanizer column, a benzene column, and a cumene colume. The effluent enters the depropanizer wherein propane diluent is removed overhead to provide a propane recycle stream for return to the reaction zone and a net propane product stream which is normally withdrawn to the fuel gas system or sent to product storage as liquefied petroleum gas (LPG). The bottoms liquid from the depropanizer passes into the benzene column which yields a benzene overhead stream. Part of the benzene is recycled to the reaction zone and a second part is withdrawn from the process in order to avoid the accumulation of non-aromatic contaminants which enter the process as trace constituents in the benzene feed. The benzene column bottoms stream passes to a cumene column which produces as overhead comprising high purity cumene product and a bottoms of heavy alkylbenzene by-product, comprising polyalkylated benzene such as diisopropylbenzene.

In the typical oligomerization process, an olefin-acting compound is oligomerized over a solid phosphoric acid catalyst in the presence of an unreactive diluent to produce a desired oligomerized product and partially-oligomerized product which must be separated therefrom. Typically, in the oligomerization of a propylene-propane mixture, it is the art to provide a recycle diluent propane stream for return to the reaction zone, and to recycle partially-oligomerized product to the reaction zone for further oligomerization with propylene to produce additional product. It is well known to those skilled in the art, that the required separation of the reactor effluent is accomplished by passing the effluent into a series of fractionating columns comprising a depropanizer column, a column for obtaining the desired recycle fraction of partially-oligomerized product, and a column for recovery of the desired oligomerized product from the heavy oligomerized by-product.

The use of fixed beds of solid phosphoric acid catalyst for aromatic alkylation and olefinic oligomerization has been known for some time, and it has been well established that this catalyst is susceptible to deterioration of both a chemical and physical nature due to an alteration of its moisture content. The loss of moisture causes deterioration of the catalyst by powdering and caking, ultimately resulting in the build-up of a high pressure drop through the catalyst bed and subsequent heat exchange equipment. On the other hand, when excessive moisture is present in the feed to the reaction zone, the catalyst softens and tends to form sludge. The sludge also causes plugging of the catalyst bed and fouling of heat exchange equipment with a resulting increase in pressure drop.

The problem of proper hydration control on the catalyst is particularly prevalent in aromatic alkylation processing. The aromatic hydrocarbons have a pronounced tendency to leach chemically combined water out of the catalyst particles, thereby changing the balance between chemically fixed phosphoric acid and free $P_2O_5$. This loss of moisture not only results in the physical and chemical deterioration of the catalyst as noted hereinabove, but it also produces a loss of catalyst activity. Operation with low activity catalyst requires an increase in operating temperature levels, resulting in an increase in by-product production.

It is, therefore, typical in the art of aromatic alkylation to inject a controlled amount of water into the combined reactor feed in order to maintain catalyst hydration at an optimum operating level. Typically, the water injection rate is maintained at a level of from about 100 p.p.m. to 500 p.p.m. in aromatic alkylation processing. In the alkylation of benzene with propylene to produce cumene, it is preferred that the water injection rate be sufficient to maintain a moisture content in the combined reactor feed of from 200 to 250 p.p.m.

Since the combined feed to the aromatic alkylation reaction zone contains moisture and there is a tendency for the feed to leach a slight amount of phosphoric acid and moisture from the catalyst, the reactor effluent will normally contain phosphoric acid and a significant amount of water. Concentrated phosphoric acid is typically withdrawn from the effluent by settling out in an effluent receiver, but the effluent which then is passed to fractionation contains a significant amount of water. This water is typically removed from the alkylatable aromatic compound before it is recycled to the reaction zone in order that proper hydration control in the combined feed to the reactor may be more easily maintained.

The drying of the acid-free effluent is accomplished in the typical prior art cumene process by depropanizing the reactor effluent under conditions sufficient to take the moisture overhead with the propane vapor. The vapor is condensed to provide an aqueous phase which is discarded, and a propane phase which is relatively dry and which is recycled at least in part to the reactor.

Since the fresh benzene, which is fed to the typical cumene processing unit will contain traces of water, it is normal in the art to charge the fresh benzene to the depropanizing fractionator for drying simultaneously with the reactor effluent. Such dehydration in the depropanizing column produces a bottoms fraction comprising benzene, cumene, and heavy alkylbenzene, which is substantially dry. The benzene which is subsequently fractionated from the depropanizer bottoms is thereafter passed to the reaction zone substantially free of water.

Because the recycle portions of the reactor effluent and the fresh benzene feed to the alkylation process are thus rendered substantially free of water, it will be readily seen that it, therefore, is critically important that the water injection rate at the reaction zone be maintained at all times within the limits prescribed for proper hydration control of the solid phosphoric acid catalyst.

While the problem of maintaining proper catalyst hydration is most pronounced in aromatic alkylation processing, it is well known by those skilled in the art that the problem also exists in olefinic oligomerization processing. The comments made hereinabove concerning water injection into the combined reactor feed and the typical dehydration of the reactor effluent, therefore, apply with equal force to the olefinic oligomerization process. The noted exception is that the moisture content of the combined reactor feed must be maintained at a higher level in the oligomerization process. This necessity for a higher moisture level is due to the difference in reactor operating conditions between the aromatic alkylation and olefinic oligomerization processes.

It is well known to those skilled in the art that in spite of prior art water injection techniques, proper catalyst hydration control is rarely achieved in the commercial operation of aromatic alkylation processing units and olefinic oligomerization processing units. The water injection equipment usually comprises a small pump and a small water tank. Since the water injection rate is only a few parts per million based upon the combined reactor feed, the typical flow rate which is required will be about 1 gallon per hour of water for a processing unit typically charging 3,000 barrels per day of hydrocarbon feed.

Because the water injection processing equipment is so small in comparison to the aromatic alkylation unit or the olefinic oligomerization unit, this equipment tends to be neglected by the operating personnel. As a consequence, the water injection tank may run dry so that the combined feed being charged to the reactor will be substantially void of moisture. Upon other occasions the pump rate may be set too high thereby providing that the combined feed will contain an excessive amount of moisture. Therefore, it is typical commercial operating experience that the water injection rate fluctuates too widely for proper hydration control on the solid phosphoric acid catalyst contained within the reactor. This wide fluctuation of water injection rates often results in a premature physical deterioration of the catalyst in the manner set forth hereinabove. As previously noted, the catalyst prematurely loses activity, thus requiring an increase in operating temperatures and thereby resulting in an increase of by-product formation. The ultimate result is that the typical commercial unit having irregular control of the water injection rate to the reactor, will require a premature plant shut-down due to the catalyst deterioration, and the net result is that the operation produces unnecessary economic losses.

SUMMARY OF THE INVENTION

It is an object of the present invention to provide a method for controlling the moisture content of the feed to a reaction zone. It is a further object of the present invention to provide a process for controlling the moisture content of the feed to a reaction zone in a manner sufficient to maintain the state of hydration of a catalyst contained therein at a predetermined level. It is a particular object of the present invention to provide an improved method for controlling the state of hydration of a solid phosphoric acid catalyst contained in an aromatic alkylation reaction zone or in an olefinic oligomerization reaction zone. It is a specific object of this invention to produce ethylbenzene, cumene, heptene, propylene-trimer and propylene-tetramer in a more economical and facile manner.

These and other objectives will be readily ascertained from the following description and the attached drawing which is a simplified flow diagram setting forth one specific embodiment of the invention.

The objects of this invention are achieved by entirely eliminating the prior art water injection system from the aromatic alkylation reaction zone or the olefinic oligomerization reaction zone. This is accomplished by modifying the prior art fractionation zone in a manner sufficient to produce, not the typical prior art dry combined reactor feed, but rather a *wet* recycle feed for the reactor. The fractionation zone is modified to provide that the portion of the reactor effluent which is recycled to the reaction zone contains moisture in the prescribed amount for proper catalyst hydration control.

By the practice of this invention, as typically applied to a cumene processing unit, propane for recycle to the reaction zone is not produced as an overhead product, but rather as a bottoms product which is made in conjunction with the recycle benzene which is sent to the reaction zone. By the process of the present invention the water which is typically contained in the reactor effluent is not stripped out of the recycle fraction but is retained, at least in part, in the recycle fraction and sent back to the reactor.

As noted hereinabove, fresh benzene which is introduced into the cumene alkylation unit contains water. By the process of the present invention the fresh benzene is not stripped of its water but rather is sent to a saturation zone at elevated temperature in order to pick up an excess of water. The saturated benzene is then sent to a rectifying column in conjunction with the moisture-containing recycle portion of the reactor effluent.

By proper maintenance of operating conditions in the rectifying column, a wet bottoms stream is produced which comprises propane and benzene for return to the reaction zone and which contains the amount of water which is required for proper catalyst hydration control in the reaction zone.

In addition, a wet overhead product is removed from the top of the rectifying column. This overhead comprises excess propane and excess water. The propane is then removed from the processing unit and sent to a fuel gas system or an LPG recovery system. The amount of propane which is removed from the rectifying column is equivalent to the amount of propane which is introduced into the reaction zone as a constituent of the propylene-propane feed. The excess water which is removed from the overhead receiver of the rectifying column is then returned to the saturation zone for further contact with fresh benzene feed.

In accordance with the foregoing brief disclosure, therefore, a broad embodiment of this invention may be characterized as a process for maintaining the water content of the feed to reaction zone at a controlled level which comprises, passing at least a part of the reactor feed into a saturation zone containing water maintained under saturation conditions; withdrawing from the saturation zone the part of reactor feed saturated with water; passing the saturated part of reactor feed into a separation zone maintained under separation conditions; withdrawing from the separation zone a first portion of water; withdrawing from the separation zone the part of reactor feed containing a second portion of water in an amount sufficient to produce the controlled level of water in the feed to the reaction zone; and passing the part of reactor feed containing the second portion of water into the reaction zone.

A preferred embodiment of the present invention may be characterized as a process for maintaining the water content of the feed to a reaction zone at a level sufficient to maintain the state of hydration of a catalyst contained therein which comprises, passing at least a part of reactor effluent from the reaction zone into a distillation zone maintained under separation conditions; passing at least a part of the reactor feed into a saturation zone containing water maintained at saturation conditions; withdrawing from the saturation zone the part of reactor feed saturated with water; passing the saturated part of reactor feed into the distillation zone; withdrawing from the distillation zone an overhead fraction containing a first portion of water; withdrawing from the distillation zone a bottoms fraction comprising the part of reactor feed and containing a remaining portion of water in an amount sufficient to maintain the state of hydration of the catalyst; and passing the bottoms fraction into the reaction zone.

A particularly preferred embodiment of the present invention may be characterized by the separation process disclosed in the two embodiments above wherein the reaction zone comprises an aromatic alkylation reaction zone and the reaction zone contains at least one fixed bed of a solid phosphoric acid catalyst.

A further preferred embodiment of the present invention may be characterized by the two broad embodiments disclosed hereinabove wherein the reaction zone comprises an oligomerization reaction zone and the reaction zone contains at least one fixed bed of a solid phosphoric acid catalyst.

A clear understanding of the present invention may now be readily obtained by referring to the examples and the accompanying drawing which sets forth a simplified flow for carrying out one specific embodiment in which the process of the present invention is practiced.

DRAWING AND EXAMPLE 1

As previously noted, one particularly preferred embodiment of this invention comprises the inventive process wherein the state of catalyst hydration is controlled during the synthesis of cumene in an aromatic alkylation process. Referring now to the drawing, propylene reacts with benzene in the presence of propane and a controlled amount of water over a solid phosphoric acid catalyst contained in five fixed beds in a reaction zone, not shown, under alkylation reaction conditions.

The resulting cumene reactor effluent comprising propane, unreacted benzene, cumene product, and heavy alkylbenzene by-product (typically comprising diisopropylbenzene) enters the inventive process via line 1 at a rate of 3371.27 mols/hr. (As used herein the term mols per hour refers to pounds mols per hour.) The reactor effluent contains 2.88 mols/hr. of water which constitutes 200 p.p.m. of water by weight in the effluent stream. The effluent leaves the reaction zone at 460° F. and 500 p.s.i.g. via line 1 and passes through a back-pressure control valve 2. The effluent then enters a first stage rectifier column 4 via line 3. The effluent is flashed therein at a pressure of 245 p.s.i.g., and at a resultant adiabatic flash temperature of 410° F.

The flashed effluent enters the first stage rectifier column 4 at a lower locus below suitable fractionation trays which provide a rectification zone within the column. The hot vapor portion of the flashed effluent passes through the rectification zone and is processed in a manner which will be disclosed hereinafter. The hot liquid portion of the effluent drops to the bottom of the first stage rectifier column 4 and is separated therein into two phases.

An aqueous phase containing concentrated phosphoric acid is withdrawn from column 4 via line 5 and is sent to a disposal system, not shown. This stream normally consists of about one gallon per day of aqueous concentrated phosphoric acid and comprises the typical phosphoric acid solution which is leached off of the catalyst in the alkylation reaction zone.

The major portion of the bottoms liquid separated in column 4 is a hydrocarbon phase comprising benzene and alkylated benzene compounds. This phase is withdrawn from the bottom of the first stage rectifier column 4 via line 6 at a temperature of 390° F. and a pressure of 245 p.s.i.g. This hydrocarbon liquid is withdrawn at a rate of 1965.87 moles/hr. and it contains 0.58 mol/hr. of water.

The hydrocarbon liquid withdrawn from the first stage rectifier column 4 via line 6 passes to a fractionation zone 8 which comprises the benzene column and the cumene column which are typical in the art as previously described hereinabove. The benzene column is operated under conditions sufficient to produce a benzene overhead fraction and a bottoms fraction comprising alkylbenzene substantially free of benzene and lighter constituents. The alkylbenzene fraction is passed to the cumene column which is operated under conditions sufficient to produce a high purity cumene product and a heavy alkylbenzene by-product.

Fractionation zone 8 produces a heavy alkylbenzene by-product comprising diisopropylbenzene at a rate of 9.73 mols/hr. via line 9 and a high purity cumene product at a rate of 282.40 mols/hr. via line 10. These two streams are substantially free of water. In addition, the fractionation zone 8 produces three benzene streams. A first benzene stream is withdrawn via line 11 at a rate of 5.20 mols/hr. This stream is a benzene purge stream which is sent to a subsequent recovery system, not shown. The withdrawal of the benzene purge stream via line 11 is necessary in order to eliminate unreactive hydrocarbon constituents which enter the alkylation process as trace contaminants of the fresh benzene feed. These unreactive contaminants must be withdrawn from the system in order to avoid their accumulation within the alkylation processing unit. A second benzene stream is withdrawn from fractionation zone 8 via line 12 at a rate of 1018.42 mols/hr. This stream contains 0.35 mol/hr. of water and is recycled to the reaction zone in a manner which will be set forth hereinafter. A third benzene stream is withdrawn from fractionation zone 8 via line 13 at a rate of 650.12 mols/hr. This stream contains 0.23 mol/hr. of water and is sent back to the first stage rectifier column 4 as the reflux which is required therein.

As the flashed effluent vapors, which enter first stage rectifier column 4, pass up through the rectification zone within the column, they are contacted by the refluxing liquid in order to provide that virtually no alkylated benzene compounds will leave the top of column 4 with the vapor. A final vapor is withdrawn from column 4 via line 7 at a rate of 2055.52 mols/hr. This vapor stream comprises benzene and propane and contains 2.53 mols/hr. of water. The vapor enters heat exchanger 14 at a temperature of 385° F. and a pressure of 243 p.s.i.g. The vapor is partially condensed therein and cooled to 320° F. before passing into second stage rectifier column 16 via line 15.

The feed entering second stage rectifier column 16 via line 15 is introduced into the bottom of the column at a locus below suitable fractionation trays which are provided for rectification of the vapor. The liquid portion of the feed drops to the bottom of column 16 where it is combined with cool refluxing liquids from the trays above to provide a bottom temperature on the column of 240° F. at a pressure of 233 p.s.i.g. The vapor portion of the feed entering column 16 via line 15 passes up through the rectification zone of the column wherein it is contacted by a first wet reflux entering column 16 via line 29 and a second wet reflux entering column 16, via line 21. Both "wet reflux" streams contain water, as shall be set forth hereinafter. The rectification of the vapor by the wet reflux is conducted under conditions sufficient to produce a net overhead vapor comprising propane and water having substantial freedom from benzene.

The vapor fraction leaves the top of second stage rectifier column 16 via line 17 at a rate of 1461.08 mols/hr. The vapor stream comprises propane having a moisture content of 4.13 mols/hr. The vapor enters condenser 18 at 120° F. and 230 p.s.i.g., wherein it is condensed and cooled to 100° F. before being introduced into receiver 20 via line 19 at a pressure of 225 p.s.i.g.

The condensed liquid separates into an aqueous phase and a hydrocarbon phase within receiver 20. Part of the hydrocarbon phase is withdrawn via line 21 at a rate of 1457.05 mols/hr. and returned to second stage rectifier column 16 as the second wet reflux noted hereinabove. This reflux stream comprises propane and 1.04 mols/hr. of water, and it is introduced into second stage rectifier column 16 at a locus above the fractionation trays. A second portion of the hydrocarbon phase is withdrawn from receiver 20 via line 22 at a rate of 0.94 mol/hr. This stream comprises propane saturated with moisture and is sent to a fuel gas header or to a LPG recovery system, not shown. This net propane stream comprises the unreactive propane introduced into the system with the fresh propylene-propane feed.

The aqueous phase is withdrawn from receiver 20 via line 23 at a rate of 3.09 mols/hr. and a temperature of 100° F. This stream comprises water having a trace amount of propane contained therein.

A fresh benzene feed is introduced into the process of the present invention from benzene storage tanks, not shown, via line 24 at a rate of 297.49 mols/hr. and a temperature of 40° F. The fresh benzene feed contains 0.45 mol/hr. of water of saturation, and it is combined with the circulating water of line 23 in line 24. The mixture of benzene and water is introduced into heat exchanger 25 via line 24 at a rate of 300.58 mols/hr., comprising 3.54 mols/hr. of water in the benzene stream. Exchanger 25 heats the benzene-water mixture to 150° F., and the resulting stream is then introduced into a water separator 27 via line 26 at a pressure of 228 p.s.i.g. Under these conditions of temperature and pressure, the saturated benzene separates to the top of vessel and excess water settles to the bottom. A net excess of water is withdrawn from separator 27 via line 28 at a rate of 0.49 mol/hr. and sent to a disposal system, not shown.

Saturated benzene feed is withdrawn from water separator 27 via line 29 and introduced into second stage rectifier column 16 as a wet benzene feed at a rate of 300.09 mols/hr. The wet benzene feed, containing 3.05 mols/hr. of water, enters column 16 at 150° F. as the first wet reflux stream which was noted hereinabove.

The introduction of the wet benzene feed via line 29 and the wet propane reflux via line 21 into second stage rectifier column 16, as the first and second wet reflux streams noted hereinabove, establishes an equilibrium moisture content in the rectification zone of column 16. Conditions of temperature and pressure are maintained within column 16 in a manner sufficient to control the distribution of water in the liquid phase and in the vapor phase. In the instant example, these conditions provide that moisture is carried overhead with the propane vapor via line 17 sufficient to establish a continuous circulation of water via line 23 at a rate of 3.09 mols/hr. of water. Additionally, these operating conditions provide wet liquid hydrocarbon which refluxes down from the fractionation trays and combines with the wet liquid portion of the feed entering column 16 via line 15 in the manner described hereinabove.

A wet liquid bottoms stream is thus withdrawn from second stage rectifier column 16 via line 30 at a rate of 2351.58 mols/hr. This stream contains propane and benzene for recycle to the reaction zone as required in the typical aromatic alkylation process. This stream also contains 2.49 mols/hr. of water dissolved in the hydrocarbon liquid.

The wet recycle hydrocarbon of line 30 is combined with the recycle benzene of line 12, and with a fresh propylene-propane feed which is introduced into the process via line 31. The recycle benzene of line 12 comprises 1018.42 mols/hr. of total liquid comprising substantially pure benzene, but containing 0.35 mol/hr. of water. The fresh propylene-propane feed of line 31 amount to 305.52 mols/hr. of hydrocarbon comprising propylene, containing 0.94 mol/hr. of propane and 0.04 mol/hr. of water. The resulting mixture comprising propylene, propane, and benzene is passed via line 32 into the aromatic alkylation reaction zone at a rate of 3675.52 mols/hr. The combined reactor feed in line 32 contains 2.88 mols/hr. of water, which is equivalent to a moisture content by weight on the combined feed of 200 p.p.m. This combined reactor feed enters the reaction zone under alkylation reaction conditions, wherein it maintains the proper state of hydration on the solid phosphoric acid catalyst contained therein, and whereby it produces the cumene reactor effluent which enters the process of the present invention via line 1 as noted hereinabove.

EXAMPLE 2

Operation of the cumene processing unit for Example 2 is virtually identical to that disclosed in Example 1. However, the fresh benzene feed introduced via line 24 does not enter from a benzene storage tank at 40° F., but is introduced directly into line 24 from a benzene producing refinery unit at a temperature of 104° F. Since the fresh feed is at a higher elevated temperature, the water content thereof is no longer 0.45 mol/hr. The saturated fresh benzene feed now contains 1.47 mols/hr. of water at 104° F.

The benzene feed comprising 297.04 mols/hr. of benzene and 1.47 mols/hr. of water is introduced into the inventive process via line 24 and combined with 3.09 mols/hr. of water which is introduced via line 23. The combined mixture of benzene and water enters heat exchanger 25 wherein its temperature is elevated to 150° F. A resulting wet benzene containing 4.56 mols/hr. of dissolved water and of free water phase, passes into the water separator 27 via line 26 at 150° F.

The hydrocarbon and water phases separate within water separator 27. A net saturated benzene stream is withdrawn therefrom and introduced into second stage rectifier column 16 via line 29 at a rate of 297.04 mols/hr. of benzene hydrocarbon and 3.05 mols/hr. of water. This wet benzene feed is identical to the composition which was disclosed in Example 1. The aqueous phase which separates in water separator 27 is withdrawn via line 28 at a rate of 1.51 mols/hr. This rate is increased over what was experienced in Example 1 due to the increased saturation of the fresh benzene feed introduced into the process via line 24 at 104° F.

The water saturation zone, comprising lines 23, 24, 26, 28, and 29, and comprising heat exchanger 25 and water separator 27, initially experiences some operating fluctuation due to the increase water level introduced via line 24 with the fresh benzene feed. However, despite these minor fluctuations, the water saturation zone ultimately reaches an equilibrium condition whereby the water content in lines 24, 26, and 28, is increased, but little or no change of operating conditions or phase equilibria occurs within the second stage rectifier column 16. Additionally, no change of operating conditions or equilibria occurs within the remainder of the aromatic alkylation processing plant. The net result is that despite the increased introduction of moisture with the fresh benzene feed, the water saturation zone compensates by discharging more water via line 28 so that no change of water content in any of the other streams occurs within the process. The combined reactor feed which is introduced into the reaction zone via line 32 continues to contain 2.88 mols/hr. of water, comprising 200 p.p.m. of water based upon the weight of the combined reactor feed.

A comparison of the contents of the various streams appears in Table No. 1 wherein it will be seen that the mols/hr. of hydrocarbon and the mols/hr. of water in the various streams remains identical in Examples 1 and 2, with the exception of lines 24, 26, and 28 as previously noted.

EXAMPLE 3

Operation of the cumene processing unit continues as disclosed in Example 2 above, but it is now desired to increase the water injection rate to the reactor to a level of 250 p.p.m. of water in the combined reactor feed. In order to accomplish this, a greater heat input is introduced at heat exchanger 25 in order to increase saturation of the benzene entering second stage rectifier column 16 via line 29. Therefore, the mixture of benzene and water which is produced in line 24 by combination of the streams of lines 23 and 24 as defined in Example 2, is introduced into exchanger 25 and discharged therefrom at a temperature of 185° F.

The mixed benzene and water stream passes via line 26 into water separator 27 wherein the hydrocarbon and water phases are separated. Because of the temperature elevation from 150° F. to 185° F., the benzene hydrocarbon dissolves a greater quantity of water. Therefore, the wet benzene passes from water separator 27 to second stage rectifier column 16 via line 29 with a water content of 3.86 mols/hr.

During the interim while the temperature is increased to 185° F. and equilibrium is being established in the saturation zone, a lesser amount of water is discharged via line 28. During this period the water contained within second stage rectifier column 16 increases. Once equilibrium is established, the water content of the vapor in line 17 is found to have increased from 4.13 mols/hr. to 4.94 mols/hr. while the water circulation rate in line 23 has increased from 3.09 mols/hr. to 3.90 mols/hr. When equilibrium within the second stage rectifier column 16 is established, the water withdrawal in line 28 again stabilizes at 1.51 mols/hr.

Because of the presence of a greater amount of water on the fractionating trays within second stage rectifier column 16, a greater amount of water becomes dissolved in the liquid phase which is present in the column. Consequently, once the column reaches equilibrium conditions, the bottoms fraction comprising propane and benzene which leaves column 16 via line 30 at a rate of 2349.09 mols/hr. of hydrocarbon, will contain water in the increased amount of 3.11 mols/hr.

Since the water content of the hydrocarbon of line 30 has been increased, equilibrium is shifted throughout all other streams within the cumene processing unit. All streams which have been noted as containing water in the discussion of Example 1 become elevated in water content. Eventually, equilibrium becomes established whereby the combined reactor feed of line 32 contains 3.60 mols/hr. of water, which is equivalent to 250 p.p.m. of water based upon the weight of combined reactor feed. The increased water content of all streams will be noted in Table No. 1.

PREFERRED EMBODIMENTS

The data from the three examples is summarized in Tables 1 and 2. Table 1 is a summary of all flow rates and stream distributions showing the separation between the hydrocarbon and water phases for each stream under equilibrium conditions. Table 2 shows the operating conditions for the hydration control system whereby the equilibrium of water in the combined reactor feed may be maintained or shifted as required.

TABLE I.—FLOW RATES AND STREAM COMPOSITIONS, MOLS/HR.*

| Line No. | Stream designation | Example I | Example II | Example III |
|---|---|---|---|---|
| 1 | Cumene reactor effluent: | | | |
| | Hydrocarbon | 3,368.39 | 3,368.39 | 3,368.39 |
| | Hydrocarbon, lbs./hr | 259,050 | 259,050 | 259,050 |
| | Water | 2.88 | 2.88 | 3.60 |
| | Water, p.p.m | 200 | 200 | 250 |
| 6 | First stage liquid to fractionation: | | | |
| | Hydrocarbon | 1,965.29 | 1,965.29 | 1,965.29 |
| | Water | 0.58 | 0.58 | 0.72 |
| 7, 15 | First stage vapor to second stage: | | | |
| | Hydrocarbon | 2,052.99 | 2,052.99 | 2,052.99 |
| | Water | 2.53 | 2.53 | 3.15 |
| 13 | First stage reflux: | | | |
| | Hydrocarbon | 649.89 | 649.89 | 649.89 |
| | Water | 0.23 | 0.23 | 0.27 |
| 17 | Second stage vapor: | | | |
| | Hydrocarbon | 1,456.95 | 1,456.95 | 1,456.95 |
| | Water | 4.13 | 4.13 | 4.94 |
| 21 | Second stage reflux: | | | |
| | Hydrocarbon | 1,456.01 | 1,456.01 | 1,456.01 |
| | Water | 1.04 | 1.04 | 1.04 |
| 22 | Net propane by-product: | | | |
| | Hydrocarbon | 0.94 | 0.94 | 0.94 |
| | Water | Trace | Trace | Trace |
| 23 | Overhead water circulation: | | | |
| | Hydrocarbon | Trace | Trace | Trace |
| | Water | 3.09 | 3.09 | 3.90 |
| 24 | Fresh reactant benzene feed: | | | |
| | Hydrocarbon | 297.04 | 297.04 | 297.04 |
| | Water | 0.45 | 1.47 | 1.47 |
| 26 | Benzene-water mixture: | | | |
| | Hydrocarbon | 297.04 | 297.04 | 297.04 |
| | Water | 3.54 | 4.56 | 5.37 |
| 28 | Net water discharge: | | | |
| | Hydrocarbon | Trace | Trace | Trace |
| | Water | 0.49 | 1.51 | 1.51 |
| 29 | Saturated benzene feed: | | | |
| | Hydrocarbon | 297.04 | 297.04 | 297.04 |
| | Water | 3.05 | 3.05 | 3.86 |
| 30 | Second stage liquid: | | | |
| | Hydrocarbon | 2,349.09 | 2,349.09 | 2,349.09 |
| | Water | 2.49 | 2.49 | 3.11 |
| 12 | Fractionated recycle benzene: | | | |
| | Hydrocarbon | 1,018.07 | 1,018.07 | 1,018.07 |
| | Water | 0.35 | 0.35 | 0.45 |
| 31 | Fresh propylene-propane feed: | | | |
| | Hydrocarbon | 305.48 | 305.48 | 305.48 |
| | Water | 0.04 | 0.04 | 0.04 |
| 32 | Combined reactor feed: | | | |
| | Hydrocarbon | 3,672.64 | 3,672.64 | 3,672.64 |
| | Hydrocarbon, lbs/hr | 259,050 | 259,050 | 259,050 |
| | Water | 2.88 | 2.88 | 3.60 |
| | Water, p.p.m | 200 | 200 | 250 |

* All figures designate mols/hr. except where otherwise noted.

TABLE II.—HYDRATION CONTROL SYSTEM OPERATING CONDITIONS

| | Line or vessel No. | Ex. I, 200 p.p.m. | Ex. II, 200 p.p.m. | Ex. III, 250 p.p.m. |
|---|---|---|---|---|
| Pressure, p.s.i.g.: | | | | |
| Bottom of second stage rectifier column | 16 | 233 | 233 | 233 |
| Top of second stage rectifier column | 16 | 230 | 230 | 230 |
| Overhead receiver vessel | 20 | 225 | 225 | 225 |
| Temperature ° F.: | | | | |
| Bottom of second stage rectifier column | 16 | 240 | 240 | 240 |
| Overhead receiver vessel | 20 | 100 | 100 | 100 |
| Feed to second stage rectifier | 15 | 320 | 320 | 314 |
| Vapor from second stage rectifier | 17 | 120 | 120 | 120 |
| Second stage reflux | 21 | 100 | 100 | 100 |
| Overhead water circulation | 23 | 100 | 100 | 100 |
| Fresh reactant benzene feed | 24 | 40 | 104 | 104 |
| Benzene-water mixture | 26 | 150 | 150 | 185 |
| Water separator vessel | 27 | 150 | 150 | 185 |
| Net water discharge | 28 | 150 | 150 | 185 |
| Saturated benzene feed | 29 | 150 | 150 | 185 |
| Second stage liquid | 30 | 240 | 240 | 240 |

Examples 1 and 2, as disclosed hereinabove and summarized in Tables 1 and 2, illustrate the ability of the inventive system to adjust itself to any fluctuation in the water content of the hydrocarbon entering the cumene synthesis unit. As was noted hereinabove, the operation of the cumene synthesis unit for Examples 1 and 2 was identical with the exception that the temperature of the fresh benzene feed entering via line 24 increased from 40° F. in Example 1, to 104° F. in Example 2. This increase in temperature resulted in the entry of an increased amount of water of saturation in the fresh benzene feed. As seen from the examples and as summarized in Table 1, the fresh benzene feed in line 24 increased in water content from 0.45 to 1.47 mols/hr. However, because of the inherent advantages of the inventive system no shift in water content of the other hydrocarbon streams within the cumene processing unit occurred. On the contrary, by maintaining the temperature at heat exchanger 25 at 150° F., the amount of water of saturation in the benzene entering column 16 via line 29 remained constant. The sudden increase of water introduced into the processing system was compensated for by an increase in the amount of net water discharged via line 28, from 0.49 mol/hr. to 1.51 mols/hr.

A comparison of Examples 2 and 3 illustrates the ability of the inventive processing system to be intentionally adjusted to change the water content of the feed to the reactor. In the Examples 2 and 3, the water content of the combined reactor feed in line 32 was increased from 200 p.p.m. to 250 p.p.m. This was accomplished by increasing the temperature of the benzene-water mixture leaving heat exchanger 25 from 150° F. to 185° F. This increase of 35° F. increased the level of saturation of the benzene entering column 16 via line line 29 from a level of 3.05 mols/hr. of water to 3.86 mols/hr. of water. This increased water content entering column 16 via line 29 caused an upward shift of the water content of all hydrocarbon streams as may be seen by comparing the figures for Example 2 and Example 3 which are indicated in Table 1.

It must be realized that the operating conditions which have been indicated in the foregoing examples are specific to those examples and to the cumene process wherein the present invention is practiced as one specific preferred embodiment. Thus, in the typical cumene processing unit the pressure, temperature and reflux rate which will be maintained within second stage rectifier column 16 will depend upon the amount of propane which must be removed overhead for discharge via line 22. In addition, the temperature and pressure will depend upon whether the propane to be discharged via line 22 is to be in a liquid state or in a vapor state. Typically, the pressure required for the depropanization of the feed entering via line 15 will be in the range of from 200 to 300 p.s.i.g. The temperature which will be maintained within second stage rectifier column 16 will depend upon the pressure maintained within the column, and it will also depend upon the composition of the feedstock entering via line 15. Thus, the temperature could be from 200° F. to 350° F. at the bottom of the column, and from 60° F. to 150° F. at the top of the column.

The operating conditions which may be necessary at the saturation system are also specific to these examples. Normally, the saturation zone comprising heat exchanger 25 and water separator 27 will be run at an elevated temperature and an excess amount of water will be available for discharge via line 28. However, if the benzene entering the process of the present invention via line 24 is at an excessively high temperature, it would be necessary to introduce a cooling medium into heat exchanger 25. The pressure within the saturation zone will typically be within the ranges given for second stage rectifier column 16, since the saturation zone will normally float upon the pressure of this column. However, the saturation zone could be as low as atmospheric pressure and the saturated benzene would then be pumped into the second stage rectifier column 16. However, the pressure within the saturation zone must be sufficient to keep the benzene and the water of lines 26 and 29 in the liquid state. Typically then, the saturation zone temperature may be in the range of from 40° F. to 240° F. and the pressure may be in the range of from atmospheric pressure to 300 p.s.i.g. when benzene is being saturated with water.

It is to be noted that the primary control point in the operation of second stage rectifier column 16 is the bottom temperature which is fixed due to the feed composition and column pressure. The maintenance of a fixed bottom temperature is required since the amount of propane which must be removed overhead as a net product is fixed by the amount of propane which enters the process via line 31 in the propylene-propane feed.

Since the bottoms temperature of column 16 is limited to controlling the amount of propane which must be removed overhead via line 17 and ultimately discharged via line 22, it is necessary to control the amount of water in the bottoms fraction leaving via line 30 by adjusting the water entering the fractionating column via line 29.

Those skilled in the art known that at any given operating conditions of temperature, pressure, and reflux rate the vapor to liquid ratio of the water will be constant. Therefore, in order to increase the water leaving the bottom of the column via line 30 it is necessary to introduce more water into the tower. This is done by increasing the temperature of the wet benzene feed by means of heat exchanger 25. Since the benzene at the increased temperature will contain more water, more water will appear in the rectification zone of column 16. Since the vapor to liquid ratio is constant, then more water must appear quantity-wise in both the liquid and vapor phases. On the other hand, if it is necessary to decrease the amount of water leaving via line 30, then less heat will be put in at heat exchanger 25. This will reduce the amount of water of saturation in the benzene entering via line 29, thereby introducing a lesser quantity of water in the tower. Since the vapor to liquid ratio is constant, the quantity of water in both the liquid and vapor phases will be reduced thereby.

The specific operating conditions which may be required within the saturation zone and the second stage rectifier column 16 for any specific reactor effluent composition are readily ascertainable by those skilled in the art utilizing the teachings which have been presented in the paragraphs hereinabove.

While the embodiment and the examples set forth hereinabove have been specific to the manufacture of cumene, it must be realized that the present invention is also applicable to the control of the water of hydration to the reaction zone for other alkylated aromatic hydrocarbons such as ethylbenzene. In addition, the inventive process also will have application to the synthesis of other alkylated aromatic compounds such as alkylphenols in the presence of an unreactive normally vapor diluent such as ethane, propane, and butane.

As previously noted hereinabove, the present invention also has application in the control of the moisture in the combined reactor feed to an olefinic oligomerization processing unit. Those skilled in the art will perceive that where this invention is applied to an olefinic oligomerization process, the hydrocarbon contained in lines 12, 24, and 30 will comprise partially oligomerized product. Typically, the partially oligomerized product will be removed in part from the fractionation zone 8 and sent to line 24. Normally, it would be advantageous to take this portion of the partially oligomerized product through a tank of water or other means of saturation in order to introduce additional moisture into the hydrocarbon stream. In this manner the partially oligomerized product containing a substantial amount of water would be combined with the circulating water stream of line 23 for passage through heat exchanger 25 into water separator 27. In such a manner the method of control of hydration of the reactor catalyst could be maintained as set forth in the drawing and the examples given hereinabove for the typical cumene synthesis unit.

While the process of the present invention has been set forth wherein the saturation zone is operated in conjunction with a second stage rectifier column 16, it must be realized that this is only one specific embodiment wherein the present invention may be practiced. Those skilled in the art will perceive that column 16 could comprise a typical prior art fractionation column such as a depropanizer column. When such a fractionating tower is employed, the recycle hydrocarbon of line 30 could either be removed from the bottom of the depropanizing column or removed as a side-cut stream. Where the recycle stream is a side-cut fraction, it could be withdrawn from the column either above or below the feed point. It would be preferable however, that the side-cut be taken above the feed point in the rectification zone rather than below the feed point in the stripping zone of the fractionating tower. The side-cut recycle fraction would then contain the desired amount of water, if the fractionating tower were operated in conjunction with the saturation zone in the manner clearly disclosed hereinabove.

In addition, it is within the scope of the present invention that the saturation zone comprising heat exchanger 25 and water separator 27 could be operated in a manner such that only a part of the hydrocarbon is passed into column 16 via line 29. It is within the scope of the present invention to remove a portion of the saturated feedstock and by-pass column 16. The by-passed portion of the saturated feedstock would then be introduced either into line 30 or line 32.

From the foregoing broad discussion it may now be summarized that a particularly preferred embodiment of the present invention is a process for maintaining the water content of the feed to an aromatic alkylation reaction zone at a level sufficient to maintain the state of hydration of a catalyst contained therein which comprises passing a least a part of the reactor effluent comprising unreactive diluent and unreacted alkylatable aromatic compound from the reaction zone into a distillation zone maintained under separation conditions; passing at least a part of a fresh feed of alkylatable aromatic into a saturation zone containing water maintained under saturation conditions; withdrawing from the saturation zone the part of alkylatable aromatic feed saturated with water; passing the saturated part of alkylatable aromatic feed into the distillatoin zone; withdrawing from the distillation zone an overhead fraction comprising unreactive diluent containing a first portion of water; withdrawing from the distillation zone a bottoms fraction comprising alkylatable aromatic and containing a remaining portion of water in an amount sufficient to maintain the state of hydration of the catalyst; and passing the bottoms fraction into the reaction zone.

Additionally, it may now be summarized that a particularly preferred embodiment of the present invention comprises the embodiment noted in the paragraph immediately above wherein the reaction zone synthesis cumene, the alkylatable aromatic compound comprises benzene, the unreactive diluent comprises propane, the reaction zone contains a solid phosphoric acid catalyst, and the amount of water contained on the bottoms stream is sufficient to provide from 100 p.p.m. to 500 p.p.m. of water based upon the weight of the total feed entering the reaction zone.

The invention claimed is:

1. Process for controlling the water content of the feed to a reaction zone at a predetermined level, which comprises:
   (a) contacting at least a part of said reactor feed with water in a saturation zone under conditions sufficient to saturate said part of reactor feed with water;
   (b) withdrawing said part of reactor feed saturated with water from said saturation zone;
   (c) passing said saturated part of reactor feed into a separation zone maintained under separation conditions;
   (d) withdrawing from said separation zone, a first portion of water;
   (e) withdrawing from said separation zone said part of reactor feed containing a second portion of water in an amount sufficient to provide said predetermined level of water in the feed to the reaction zone; and,
   (f) passing said part of reactor feed containing said second portion of water into said reaction zone.

2. Process of claim 1 wherein said separation zone comprises a distillation zone.

3. Process of claim 1 wherein said reaction zone contains a solid phosphoric acid catalyst.

4. Process of claim 3 wherein said reaction zone comprises an aromatic alkylation reaction zone.

5. Process of claim 3 wherein said reaction zone comprises an olefinic oligomerization reaction zone.

6. Process of claim 1 wherein at least a part of said first portion of water is returned to the saturation zone.

7. Process of claim 6 wherein said saturation zone comprises a heat exchanger and said part of the first portion of water is passed into said heat exchanger in admixture with said part of reactor feed.

8. Process for maintaining the water content of the feed to a reaction zone at a level sufficient to maintain the state of hydration of a catalyst contained therein, which comprises:
   (a) passing at least a part of reactor effluent from said reaction bone into a distillation zone maintained under separation conditions;
   (b) contacting at least a part of said reactor feed with water in a saturation zone under conditions sufficient to saturate said part of reactor feed with water;
   (c) withdrawing from said saturation zone, said part of reactor feed saturated with water;
   (d) passing said saturated part of reactor feed into said distillation zone;
   (e) withdrawing from said distillation zone, an overhead fraction containing a first portion of water;
   (f) withdrawing from said distillation zone, a bottoms fraction comprising said part of reactor feed and containing a remaining portion of water in an amount sufficient to maintain the state of hydration of said catalyst; and,
   (g) passing said bottoms fraction into said reaction zone.

9. Process of claim 8 wherein at least a part of said first portion of water is passed into the saturation zone.

10. Process of claim 9 wherein said saturation zone comprises a heat exchanger and said part of the first portion of water is passed into said heat exchanger in admixture with said part of reactor feed.

11. Process of claim 8 wherein said catalyst comprises solid phosphoric acid.

12. Process of claim 11 wherein said reaction zone comprises an aromatic alkylation reaction zone.

13. Process of claim 11 wherein said reaction zone comprises an olefinic oligomerization reaction zone.

14. Process for maintaining the water content of the feed to an aromatic alkylation reaction zone at a level sufficient to maintain the state of hydration of a catalyst contained therein, which comprises:
   (a) passing at least a part of reactor effluent comprising unreactive diluent and unreacted alkylatable aromatic compound from said reaction zone into a distillation zone maintained under separation conditions;
   (b) contacting at least a part of a fresh feed of akylatable aromatic with water in a saturation zone under conditions sufficient to saturate said part of reactor feed with water;

(c) withdrawing from said saturation zone, said part of alkylatable aromatic feed saturated with water;

(d) passing said saturated part of alkylatable aromatic feed into said distillation zone;

(e) withdrawing from said distillation zone, an overhead fraction comprising unreactive diluent containing a first portion of water;

(f) withdrawing from said distillation zone a bottoms fraction comprising alkylatable aromatic and containing a remaining portion of water in an amount sufficient to maintain the state of hydration of said catalyst; and (g) passing said bottoms fraction into said reaction zone.

15. Process of claim 14 wherein said reaction zone contains a solid phosphoric acid catalyst and said amount of water contained in the bottoms stream is sufficient to provide a feed moisture content of from 100 p.p.m. to 500 p.p.m. of water based on the weight of the total feed entering the reaction zone.

16. Process of claim 15 wherein said reaction zone comprises benzene, said alkylatable aromatic compound synthesizes cumene, said unreactive diluent comprises propane, and said amount of water contained in the bottoms stream is sufficient to provide from 200 p.p.m. to 250 p.p.m. of water based upon the weight of the total feed entering the reaction zone.

17. Process of claim 14 wherein at least a part of said first portion of water is returned to the saturation zone.

18. Process of claim 17 wherein said saturation zone comprises a heat exchanger and said part of the first portion of water is passed into said heat exchanger in admixture with said part of alkylatable aromatic feed.

19. Process of claim 14 wherein said saturation zone is maintained at a temperature in the range of from about 40° F. to about 240° F. and at a pressure in the range of from about atmospheric pressure to about 300 p.s.i.g.

References Cited
UNITED STATES PATENTS

| | | | |
|---|---|---|---|
| 3,437,705 | 4/1969 | Jones | 260—671 |
| 3,437,706 | 4/1969 | Gantt et al. | 260—671 |
| 3,437,707 | 4/1969 | Sulzbach | 260—671 |
| 3,437,708 | 4/1969 | Gantt | 260—671 |

DELBERT E. GANTZ, Primary Examiner

C. R. DAVIS, Primary Examiner

U.S. Cl. X.R.

260—683.15